March 24, 1936.    H. M. BRAMBERRY    2,035,220
SURFACE SMOOTHNESS INDICATOR
Filed Aug. 17, 1933    3 Sheets-Sheet 1
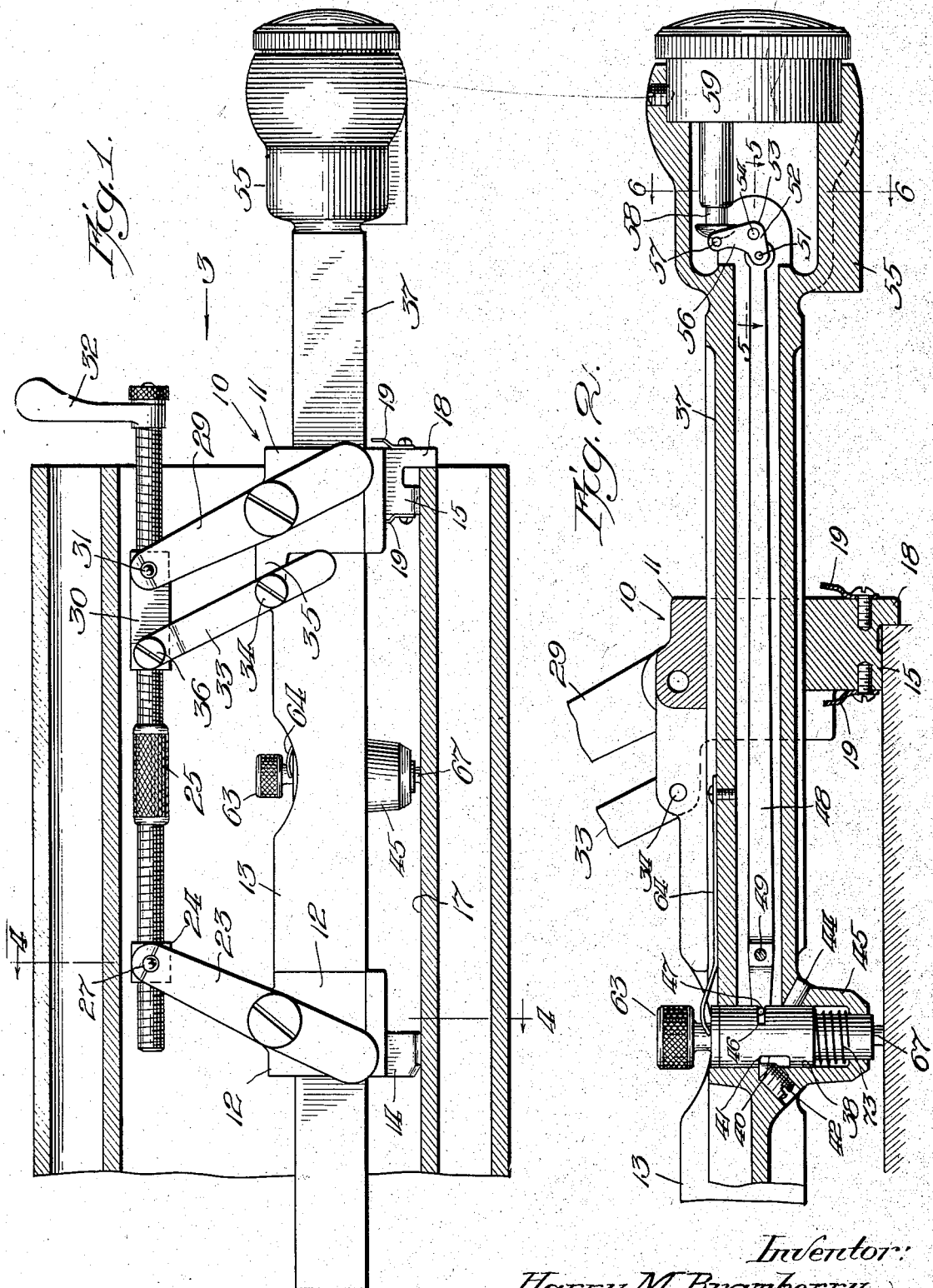
Inventor:
Harry M. Bramberry
By Rector, Hibben, Davis & Macauley
Attys.

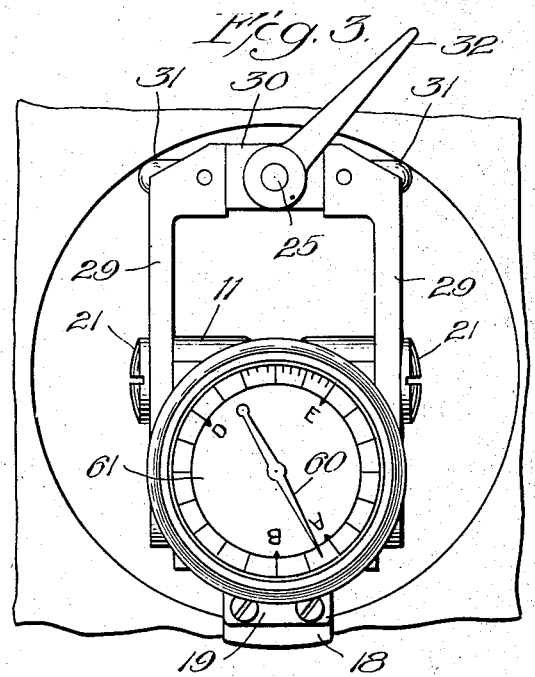
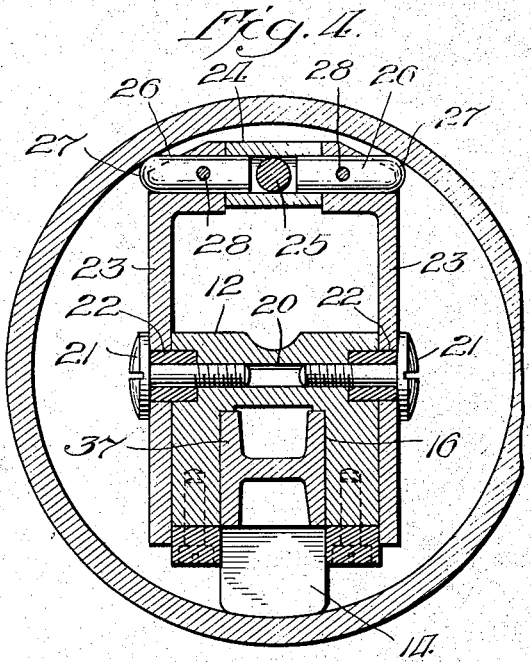
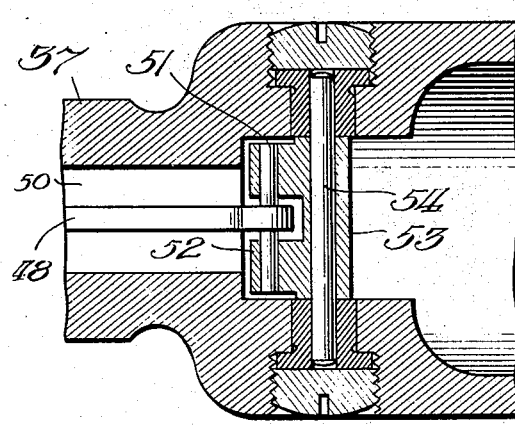
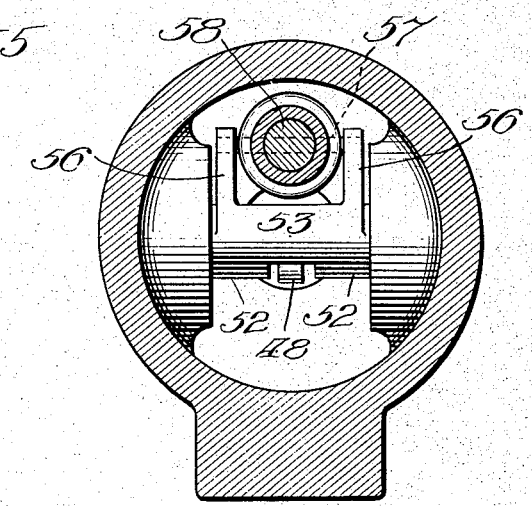

March 24, 1936.   H. M. BRAMBERRY   2,035,220
SURFACE SMOOTHNESS INDICATOR
Filed Aug. 17, 1933   3 Sheets-Sheet 3
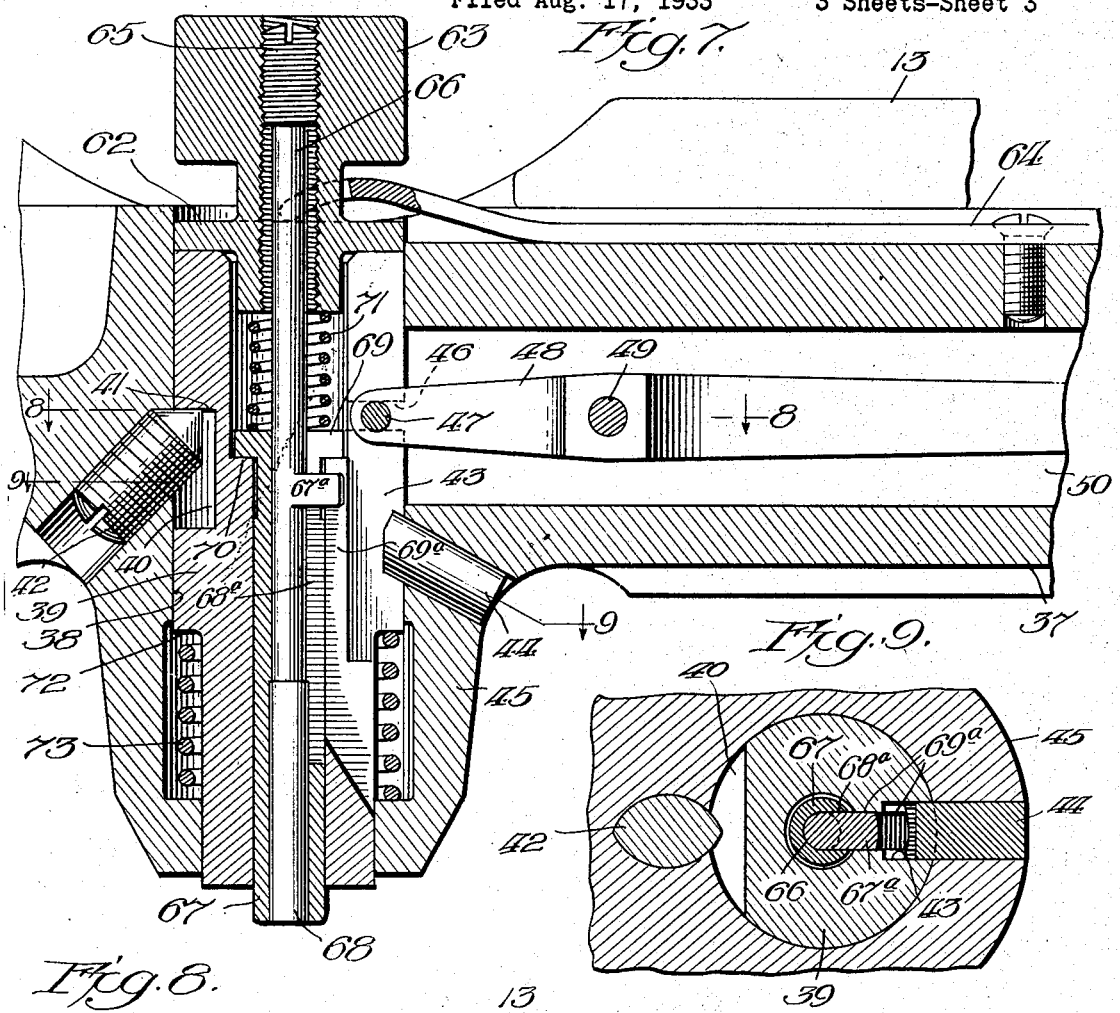
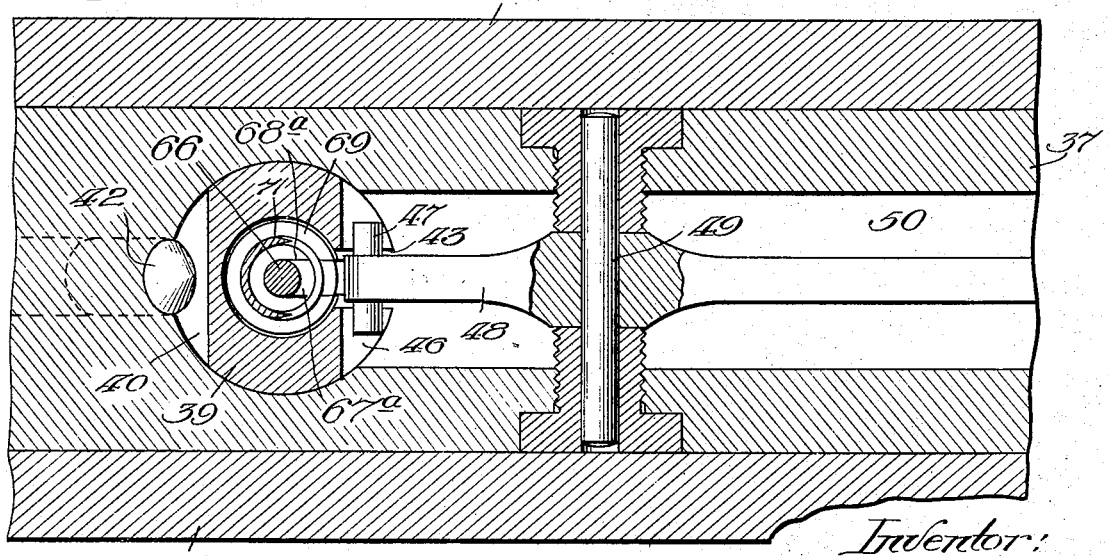
Inventor:
Harry M. Bramberry Patented Mar. 24, 1936

2,035,220

UNITED STATES PATENT OFFICE 2,035,220

SURFACE SMOOTHNESS INDICATOR

Harry M. Bramberry, Newcastle, Ind., assignor to The Perfect Circle Company, Hagerstown, Ind., a corporation of Indiana Application August 17, 1933, Serial No. 685,563

10 Claims. (Cl. 73—51)

My invention, broadly considered, relates to an indicator for determining the smoothness factor of any surface, whether flat, curved or irregular in contour, and is more particularly concerned with the ascertainment of such factors for the cylinder walls of engines.

In the operation of engines employing piston rings, particularly those of the automotive type, the surface condition of the cylinder bore so materially affects the life of the rings that it is important to devise some method whereby the different bore finishes can be graded or determined. The finishing operation on these cylinder bores is effected by many different types of devices, each of which imparts to the bore a condition of surface smoothness that is somewhat different from the others. Accordingly, from the standpoint of the piston ring manufacturer, it is desirable to have some knowledge of these bore surface conditions in order to more clearly evaluate piston ring life.

It is therefore the principal object of my invention to devise an indicator which operates on the principle of moving over the surface under examination a pointer or pencil device composed of a material softer than the surface, the pencil being subjected to constant pressure during its movement, and the ensuing wear being registered on a dial calibrated according to any selected scheme.

A further object is to provide an indicator of the character set forth which is constructed and arranged for determining the smoothness of engine cylinder walls, the pencil member being subjected to a straight line, controlled stroke under a constant pressure which bears some relation to the pressure with which the piston rings bear against the cylinder walls, thus simulating the action of the rings in the cylinder bore and insuring that the ensuing wear of the pencil will be a measure of the surface condition of the cylinder wall.

A further object is to devise an indicator which is capable of easy and rapid positioning within a cylinder bore by means of devices which are moved to contact with the cylinder wall in order to maintain the steadiness of the instrument during the stroking movement of the pencil.

A further object is to provide an indicator employing a pencil member which is housed within and supported throughout its length by a sleeve, thus rendering possible the use of a pencil of small diameter and one that may be composed of rather soft material, the pencil bearing against the surface being tested with a greater pressure than does the sleeve to thus provide for a feeding movement of the pencil relative to the sleeve as the pencil wears.

A further object is to provide an indicator in which the sleeve support also functions as a gage to determine the zero position of the pencil at the beginning of the testing operation, the end of the pencil being adjusted to a position substantially flush with the end of the sleeve.

These and further objects of my invention will be set forth in the following specification, reference being had to the accompanying drawings, and the novel means by which said objects are effectuated will be definitely pointed out in the claims.

In the drawings:

Figure 1 is a side elevation showing one type of my improved indicator located within a cylinder bore, prior to making a determination of the cylinder surface.

Fig. 2 is an enlarged, longitudinal section of the indicator, as viewed in Fig. 1, the positioning devices for the instrument being omitted.

Fig. 3 is an end view of the indicator, as viewed in the direction of the arrow 3 in Fig. 1, showing the positioning devices swung into contact with the cylinder wall for the purpose of retaining the instrument in fixed position.

Fig. 4 is a sectional view along the line 4—4 in Fig. 1, looking in the direction of the arrows and showing the manner of mounting the positioning devices on the main housing of the indicator.

Fig. 5 is an enlarged section along the line 5—5 in Fig. 2, looking in the direction of the arrows, and showing the mounting of that portion of the translating mechanism that is connected to the dial indicator.

Fig. 6 is a section along the line 6—6 in Fig. 2, looking in the direction of the arrows.

Fig. 7 is an enlarged sectional elevation of the pencil-carrying mechanism, as shown in Fig. 2.

Fig. 8 is a section along the line 8—8 in Fig. 7, looking in the direction of the arrows, and showing the connection between the pencil mechanism and the translating devices which transmit the extent of wear of the pencil to the dial.

Fig. 9 is a section along the line 9—9 in Fig. 7, looking in the direction of the arrows, showing certain details of construction hereinafter described.

Referring to Figs. 1 and 4, the numeral 10 designates a housing composed of end pieces 11 and 12 that are preferably joined together by spaced sides 13. In vertical cross-section, each end piece is formed generally as an inverted U-shape, the open end of the piece 12 being closed by a foot 14, while the open end of the piece 11 is closed by a foot 15, the lower surfaces of these feet being preferably curved in order to conform generally to the curvature of a cylinder wall. The feet 14 and 15 are intended to support the indicator within a cylinder bore and each defines with its associated end piece an opening 16 (see Fig. 4) through which is reciprocably mounted a carrier hereinafter described. The foot 15 is further provided with a stop 18 which engages with the top surface of the cylinder block in order to limit the insertion of the indicator within the cylinder bore and is further provided with inner and outer spring devices 19 which serve to cushion the movement of the carrier presently described.

Considering the end piece 12 and referring more particularly to Fig. 4, a hole 20 is drilled through the upper portion thereof to receive from opposite sides the shanks of a pair of cap screws 21. Encircling these shanks are a pair of bushings 22 and pivotally mounted upon each of these bushings is a leg 23. There are thus two legs located on opposite sides of the piece 12, each of which is retained against the adjacent face of the end piece by the associated cap screw. Preferably, the lower end of each leg extends downwardly below its point of support to secure an effective bearing contact with the sides of the end piece in order to increase the steadiness of the instrument. At some convenient distance above the screws 21, each leg 23 is provided with a portion that faces inwardly and abuts against the opposite sides of a nut 24 that is threaded upon one end of a turnbuckle 25. The leg portions and the nut are provided with aligned apertures to receive on opposite sides of the turnbuckle pins 26 having rounded ends 27, which pins are retained in the legs by dowels 28. The inner ends of these pins extend into the nut 24 in order to provide for an interlocking engagement between the turnbuckle nut and the legs.

Similarly mounted upon the end piece 11 is a pair of legs 29 whose upper ends are similarly connected to a nut 30 by pins 31 corresponding to the pins 26. The nut 30 is mounted upon the opposite end of the turnbuckle 25. The turnbuckle possesses sufficient length so that when the instrument is inserted within a cylinder bore, the outer end of the turnbuckle will project beyond the end of the cylinder in order to expose a wing nut 32 which is fixedly mounted on the turnbuckle and which is utilized to rotate the same in order to move the legs 23 and 29 from the retracted position shown in Fig. 1 to the wall-engaging position shown in Fig. 3, wherein the rounded ends of the pins 26 and 31 substantially wedgingly engage with the cylinder wall surface generally opposite to that portion of the surface upon which the feet 14 and 15 rest.

In order to improve the general handling of the instrument and to prevent the natural tendency of the legs 23 and 29, and the turnbuckle 25, to collapse when the indicator is inserted within a cylinder bore, a special arrangement has been provided for the purpose of maintaining the indicated parts in any position in which they may be placed. To this end, a pair of links 33 are pivotally mounted as at 34 on a pair of ears 35 provided on the opposite sides of the end piece 11. At their upper ends, the links 33 are pivotally connected as at 36 to one end of the nut 30 which is lengthened for this purpose. The addition of the third arms or links insures that they and the legs 29 will maintain a condition of parallelism and so will prevent the collapse or any wabbling tendency of the indicated legs and the turnbuckle, or, in other words, the longitudinal axis of the turnbuckle will remain substantially parallel to the longitudinal axis of the carrier, hereinafter described, in all of its positions.

An elongated carrier 37 is reciprocably mounted within the openings 16 provided in the end pieces 11 and 12, the bottom of the carrier bearing upon the feet 14 and 15, while the sides of the carrier snugly fit the sides of the openings 16. Intermediate the ends of the carrier and in such a position as to always be located between the feet 14 and 15, the carrier is provided with a hole 38 (see Figs. 2 and 7) whose longitudinal axis is disposed transversely of the carrier. Referring to Fig. 7, a barrel 39 is reciprocably mounted in the hole 38 and on one side thereof is provided with a slot 40 having an end wall 41 which is contacted by the conical end of a set screw 42 in order to limit the downward movement of the barrel under the actuation of the spring presently described. The opposite side of the barrel is slotted as at 43 for a predetermined portion of its length and operating in this slot is one end of a pin 44 which is mounted in a boss 45 that depends from the underside of the slide in substantial alignment with the axis of the hole 38. The purpose of the pin 44 is to prevent rotary movement of the barrel 39 and so confine it to longitudinal movements in the hole 38.

The slot 43 is transversely slotted as at 46 intermediate its ends to receive the ends of a pin 47 that is mounted in one end of a lever 48 (see Fig. 8), the indicated end of the lever operating in the slot 43. The lever 48 is pivotally mounted intermediate its ends upon a pin 49 that is bridged across an elongated opening 50 provided in that portion of the carrier to the right of the barrel, as viewed in Figs. 2 and 7, and in the opposite, or extreme right, end of the lever is mounted a pin 51. The ends of the pin 51 are pivotally secured in the bifurcated arm 52 of a lever 53 that is pivoted on a pin 54 whose ends are mounted in the enlarged end 55 of the carrier. (See Fig. 5.) The other arm 56 of the indicated lever is also bifurcated and in the spaced ends of the last named arm is mounted a pin 57 which engages the mushroom end of a plunger 58 that is provided on a dial indicator 59 of appropriate construction. It will be understood, from an examination of Fig. 2, that the interior of the enlarged end 55 is suitably cored to provide sufficient space for the lever connections between the lever 48 and the dial indicator 59.

The internal construction of the indicator 59 forms no part of the present invention, since instruments of this general type are well known in the art. However constructed, it will be understood that the plunger 58 will at all times be maintained in contact with the adjacent pin 57 and also that movements of the plunger will occasion rotary movements of the needle 60 (see Fig. 3) which moves over a dial 61 that may be calibrated according to any desired scheme. Accordingly, movement of the barrel 39 in the manner hereinafter described will effect, through the indicated lever arrangement, a movement of the needle 60 over the dial 61.

Again referring to Fig. 7, the upper end of the barrel 39 contacts with an annular flange 62 provided on a nut 63. Contact between the flange 62 and the barrel 39 is maintained at all times by means of a leaf spring 64, one end of which is fixedly mounted to the carrier 37, while the other end is bifurcated to embrace the opposite sides of the nut 63 and to bear against the upper surface of the flange 62. The spring 64 accordingly tends always to maintain the barrel 39 in the position shown in Fig. 7, or to return the barrel to the indicated position when displaced therefrom.

The nut 63 is drilled and capped to receive the threaded end 65 of a pencil feeding and backing rod 66 that extends downwardly through the nut 63 and whose lower end is received within a sleeve 67 that is freely shiftable within the barrel 39. The rod 66 also comprises a lug 67a that extends through a slot 68a provided in the sleeve 67 and is also of sufficient length to project into a slot 69a provided in the barrel 39, the last named slot registering with the slot 43, but being of less width. Accordingly, it will be understood that, when the nut 63 is rotated, the rod 66 will be advanced or retracted within the sleeve 67, dependent upon the direction of rotation of the nut 63. Mounted within the sleeve 67 is a length of pencil 68 whose outer end is maintained flush with the end of the sleeve 67 and whose inner end abuts against the end of the rod 66.

The pencil may be composed of any suitable graphite composition, such as is customarily employed for lead pencils, or it may be made from other suitable materials, dependent upon the nature of the surface being examined and the amount of pressure to which the pencil is subjected. However, whatever material is employed, it is contemplated that it will customarily be somewhat softer than the material comprising the surface examined, because the essential principle involved in the present device is the grading of the smoothness of a surface by noting the wear of the pencil when moved thereover.

The upper end of the sleeve 67 is provided with an annular flange 69 that rides against an internal shoulder 70 provided on the barrel 39, a coil spring 71 encircling the rod 66 between the flange 69 and the lower end of the nut 63 serving to normally maintain the indicated parts in the positions noted. For some distance upwardly from its lower end, the barrel 39 is slightly reduced in diameter to thereby provide a shoulder 72 against which abuts the upper end of a coil spring 73 that encircles the barrel and which at its lower end abuts against the inside of the boss 45, the latter being appropriately cored to provide a chamber to receive the spring 73 and the lower end of the barrel projecting through the lower end of the boss.

Before describing the operation of my improved indicator, it will be understood that the normal disposition of the pencil 68 is such that its lower end is flush with the adjacent end of the sleeve 67 and that its upper end is at all times in engagement with the lower end of the rod 66 and accordingly becomes subject to the pressure of the spring 64 immediately upon pressure being exercised against the lower end of the lead sufficient to move it and the sleeve 67 upwardly. Moreover, in the position of parts shown in Fig. 7, which shows the condition obtaining before the instrument is mounted within the cylinder bore, the lower end surface of the pencil 68 projects for some predetermined distance below the plane including the lowermost surfaces of the feet 14 and 15. This arrangement provides a convenient method for determining when the wear of the pencil 68 has progressed sufficiently to require its repositioning and it also enables the utilization of the lower end of the sleeve 67 as a means for determining the zero position of the pencil.

When the instrument is first positioned within a cylinder bore, it presents the general appearance shown in Fig. 1 with the feet 14 and 15 resting on the lower surface of the cylinder bore and the legs 23 and 29 occupying the retracted position shown. It is contemplated that the characteristic manner of using the indicator is to insert the same within a cylinder bore with the motor block lying on its side. The wing nut 32 is thereupon rotated to swing the legs 23 and 29 to the substantially vertical position shown in Fig. 3 which contacts the ends of the pins 26 and 31 with the cylinder wall and thereby effectually locks the instrument in position. Inadvertent movements of the indicator are accordingly prevented, since such shifts in position would prevent the obtaining of a true determination of the surface condition of the cylinder.

Owing to the projected position of the sleeve 67 and the pencil 68, it will be obvious that, when the indicator is positioned as just set forth, the sleeve and pencil will be shifted upwardly when these parts are contacted with the surface. The sleeve 67 moves upwardly against the force of its spring 71, while the upward movement of the pencil 68 also moves upwardly the nut 63 against the pressure of the spring 64, contact between the flange 62 and the barrel 39 being maintained by the upward extension of the spring 73, while contact is also maintained between the shoulder 70 and the sleeve flange 69 by the spring 71. The barrel 39 will accordingly occupy a position wherein the shoulder 41 is somewhat spaced from the set screw 42 and this movement of the barrel will obviously cause a rocking of the lever 48 to thereby shift the needle 60 to some position on the dial 61 which might be regarded as the zero position of the needle.

At this time, the carrier 37 may be so located that the boss 45 is positioned either adjacent the end piece 12, or the end piece 11, in order to obtain the benefit of a full stroke of the carrier. If it be assumed that the boss is located adjacent the end piece 12, the operator by grasping the enlarged end 55 may withdraw the carrier from the bore until the boss contacts with the inner cushion spring 19. During this movement of the carrier, the pencil 68, being subjected to the constant pressure of the spring 64, marks the cylinder wall and the ensuing wear of the pencil results in a gradual motion downwardly of the barrel 39 with a corresponding movement on the part of the lever 48. The wear of the pencil is accordingly reflected by the movement of the needle 60 over the dial in such a manner that the extent of movement of the needle affords a measure of the degree of wear of the pencil which, in turn, is dependent upon the "smoothness" of the cylinder wall. It will be understood, that owing to the comparatively slight movements of the barrel 39 under these conditions, the nature of the lever connection between the barrel and the dial indicator is such that the barrel movement is substantially magnified in order to obtain a satisfactory movement of the needle 60.

During the downward movement of the barrel 39, the flange 69 separates from the shoulder 70 since the sleeve 67 is unable to move by reason of its contact with the surface. When the barrel has moved downwardly sufficient to contact the shoulder 41 with the set screw 42, feeding movement of the lead 68 is no longer possible owing to the contact of the flange 62 with the barrel and the needle 60 ceases its movement. It now becomes necessary to reset the pencil and this result is accomplished by withdrawing the indicator from the cylinder bore and thus permitting the several parts to assume the positions shown in Fig. 7, wherein the projection downwardly of the sleeve by the spring 71 moves the end of the sleeve beyond the end of the pencil. Thereupon the nut 63 may be rotated to advance, or move downwardly, the lead 68 until its lower end becomes flush with the lower end of the sleeve 67. The indicator is then ready again for use.

The instrument that is described in this application is more particularly intended for ascertaining the smoothness of engine cylinder walls, but it will be understood that the essential principle involved, which is the moving of a relatively soft material over a surface and the measuring of the resulting wear, is capable of broader application, so that I do not desire to be limited by the precise nature of the disclosure, since the principle is capable of adaptation to a variety of instruments for determining the smoothness of surfaces in general.

I claim:

1. An instrument for determining the smoothness factor of a surface comprising in combination, a housing adapted to be placed in proximity to the surface, a carrier movable in the housing, a pencil mechanism mounted in the carrier comprising a sleeve adapted to constantly contact the surface during the movement of the carrier, a pencil arranged to contact the surface composed of a material softer than the surface and located within the sleeve with its exposed end flush with the end of the sleeve and means for applying a constant pressure to the pencil to thereby cause a feeding movement thereof relative to the sleeve as the pencil wears, an indicator for exhibiting the extent of wear of the pencil, and translating devices connecting the mechanism and indicator.

2. An instrument for determining the smoothness factor of a surface comprising in combination, a housing adapted to be placed in proximity to the surface, a carrier movable in the housing, pencil mechanism mounted in the carrier comprising a sleeve adapted to constantly contact the surface during the movement of the carrier, a pencil arranged to contact the surface composed of a material softer than the surface and located within the sleeve with its exposed end flush with the end of the sleeve, a barrel encircling the sleeve and means for applying a constant pressure to the mechanism including the pencil and barrel to thereby effect a feeding movement of the pencil relative to the sleeve and a movement of the barrel as the pencil wears, an indicator for exhibiting the extent of wear of the pencil, and translating devices connecting the barrel and indicator.

3. An instrument for determining the smoothness factor of a surface comprising in combination, a housing adapted to be placed in proximity to the surface, a carrier movable in the housing, pencil mechanism mounted in the carrier comprising a sleeve adapted to contact the surface during the movement of the carrier, a pencil composed of a material softer than the surface and supported by the sleeve throughout substantially its entire length, one end of the pencil being flush with the surface contacting end of the sleeve, a barrel encircling and supporting the sleeve, means for limiting the movement of the barrel toward the surface and means for applying a constant pressure to the mechanism including the pencil and barrel to thereby effect a feeding movement of the pencil relative to the sleeve and a movement of the barrel as the pencil wears, an indicator for exhibiting the extent of wear of the pencil, and translating devices connecting the barrel and indicator.

4. An instrument for determining the smoothness factor of engine cylinder walls comprising a housing adapted for insertion in a cylinder bore and having a pair of feet for resting the housing on the cylinder wall, a carrier movable in the housing, pencil mechanism projecting from the carrier comprising a pencil arranged to contact the surface and composed of a material softer than the surface and means for applying a constant pressure to the pencil to effect wear thereof as the carrier is moved, an indicator for exhibiting the extent of wear of the pencil, and translating devices connecting the pencil and indicator.

5. An instrument for determining the smoothness factor of engine cylinder walls comprising in combination a housing adapted for insertion within a cylinder bore and to rest on the cylinder wall, a pair of legs swingable to contact the cylinder wall for maintaining the housing in position, a carrier movable in the housing, pencil mechanism projecting from the carrier comprising a pencil arranged to contact the surface and composed of a material softer than the surface and means for applying a constant pressure to the pencil to thereby effect wear thereof during the movement of the carrier, an indicator for exhibiting the extent of wear of the pencil, and translating devices connecting the pencil and indicator.

6. An instrument for determining the smoothness factor of engine cylinder walls comprising in combination a housing adapted for insertion within a cylinder bore and to rest on the cylinder wall, a pair of interconnected legs swingable into substantially wedge contact with the cylinder wall for maintaining the housing in position, a carrier movable in the housing, pencil mechanism projecting from the carrier comprising a pencil arranged to contact the surface and composed of a material softer than the surface and means for applying a constant pressure to the pencil to effect wear thereof during the movement of the carrier, an indicator for exhibiting the extent of wear of the pencil, and translating devices connecting the pencil and indicator.

7. An instrument for determining the smoothness factor of engine cylinder walls comprising in combination, a housing adapted for insertion within a cylinder bore and to rest on the cylinder wall, legs pivoted on the housing to contact the opposite cylinder wall, turnbuckle means connecting said legs and rotatable to swing the same into substantially wedged contact with the wall for maintaining the housing in position, a carrier movable in the housing, pencil mechanism projecting from the carrier comprising a pencil arranged to contact the wall surface and composed of a material softer than the surface and means for applying a constant pressure to the pencil to effect wear thereof during movement of the carrier, an indicator for exhibiting the extent of wear of the pencil, and translating devices connecting the pencil and indicator.

8. An instrument for determining the smoothness factor of engine cylinder walls comprising in combination, a housing adapted for insertion within a cylinder bore and to rest on the cylinder wall, legs pivoted on the housing to contact the wall opposite the housing feet, turnbuckle means connecting the legs and rotatable to substantially wedgingly contact the legs with the wall for maintaining the housing in position, a third leg connecting the housing and turnbuckle for maintaining the first two legs in any predetermined position, a carrier movable in the housing, pencil mechanism mounted in the carrier comprising a pencil arranged to contact the surface and composed of a material softer than the surface and means for applying a constant pressure to the pencil to effect wear thereof as the carrier moves, an indicator for exhibiting the extent of wear of the pencil, and translating devices connecting the pencil and indicator.

9. An instrument for determining the smoothness factor of a surface comprising in combination, a housing adapted to be placed in proximity to the surface, a carrier movable in the housing across the surface, a pencil slidable in the carrier for contact with the surface and composed of a material softer than and incapable of wearing the surface as the carrier is moved, means for supporting the pencil throughout its length, means for applying a constant pressure to the pencil to bear the same against the surface and effect movement thereof relative to the supporting means, an indicator for exhibiting the extent of wear of the pencil, and translating devices connecting the pencil and indicator.

10. An instrument for determining the smoothness factor of a surface comprising in combination, a pencil movable across the surface and composed of a material softer than and incapable of wearing the surface, a supporting sleeve surrounding the pencil throughout its length and adapted to have one end ride over the surface with one end of the pencil flush with said sleeve end, means for applying a constant pressure to the pencil to bear the same against the surface and effect movement thereof relative to the sleeve, an indicator for exhibiting the extent of wear of the pencil, and translating devices connecting the pencil and indicator.

HARRY M. BRAMBERRY.